United States Patent
Hancock et al.

(10) Patent No.: US 8,851,840 B2
(45) Date of Patent: Oct. 7, 2014

(54) CONTROL SYSTEM IN WIND TURBINE BLADES

(75) Inventors: Mark Hancock, Southhampton (GB); Nicolas Dudley Barlow, Southampton (GB); Dick Veldkamp, Houten (NL)

(73) Assignee: Vestas Wind Systems A/S, Aarhus N. (DK)

( * ) Notice: Subject to any disclaimer, the term of this patent is extended or adjusted under 35 U.S.C. 154(b) by 758 days.

(21) Appl. No.: 13/060,488

(22) PCT Filed: Aug. 28, 2009

(86) PCT No.: PCT/EP2009/061137
§ 371 (c)(1),
(2), (4) Date: May 25, 2011

(87) PCT Pub. No.: WO2010/023278
PCT Pub. Date: Mar. 4, 2010

(65) Prior Publication Data
US 2011/0217167 A1 Sep. 8, 2011

Related U.S. Application Data

(60) Provisional application No. 61/159,630, filed on Mar. 12, 2009, provisional application No. 61/196,144, filed on Oct. 14, 2008, provisional application No. 61/092,788, filed on Aug. 29, 2008.

(30) Foreign Application Priority Data

Aug. 29, 2008 (DK) ................................ 2008 01189
Oct. 14, 2008 (DK) ................................ 2008 01436
Mar. 12, 2009 (DK) ................................ 2009 00342

(51) Int. Cl.
 *F03D 11/00* (2006.01)
 *F03D 1/06* (2006.01)
 *F03D 7/02* (2006.01)

(52) U.S. Cl.
CPC ............. *F03D 1/0683* (2013.01); *Y02E 10/721* (2013.01); *F05B 2270/60* (2013.01);
(Continued)

(58) Field of Classification Search
CPC ............................... F03D 7/0236; F03D 7/024
USPC ........ 416/228, 23, 24, 226, 146 R; 290/44, 55
See application file for complete search history.

(56) References Cited

U.S. PATENT DOCUMENTS 3,047,257 A 7/1962 Chester
4,349,169 A 9/1982 McAnally
(Continued)

FOREIGN PATENT DOCUMENTS

EP 1 577 546 9/2005
EP 1 995 455 11/2008
(Continued)

OTHER PUBLICATIONS

A. Areal Calama; International Search Report and Written Opinion issued in priority international application No. PCT/EP2009/061137; 10 pages; Jan. 17, 2001; European Patent Office.
(Continued)

*Primary Examiner* — Ninh H Nguyen
(74) *Attorney, Agent, or Firm* — Wood, Herron & Evans, LLP

(57) ABSTRACT

The invention relates to a wind turbine blade with devices for modifying the aerodynamic surface or shape of the blade. The position and movement of these devices are controlled by a pneumatic actuator powered by pressure from a pressure chamber connected to the actuator via a valve system controlling the powering. The valve system in return is operated by a control unit conveying control signals to the valve system via a signal communication pathway. The communication pathway may comprise a power link or pressure tubes with a liquid or a gas. In one embodiment the gas used is of a lower molecular weight than 28.9 kg/kmol and thereby lower than air, whereby the speed of the pressure signals being sent from the control unit is increased and thereby the operational speed of the aerodynamic devices. The invention further relates to a wind turbine comprising a tower, a nacelle mounted to one end of the tower, and a rotor with at least one wind turbine blade according to the above.

23 Claims, 5 Drawing Sheets

Figure 1:
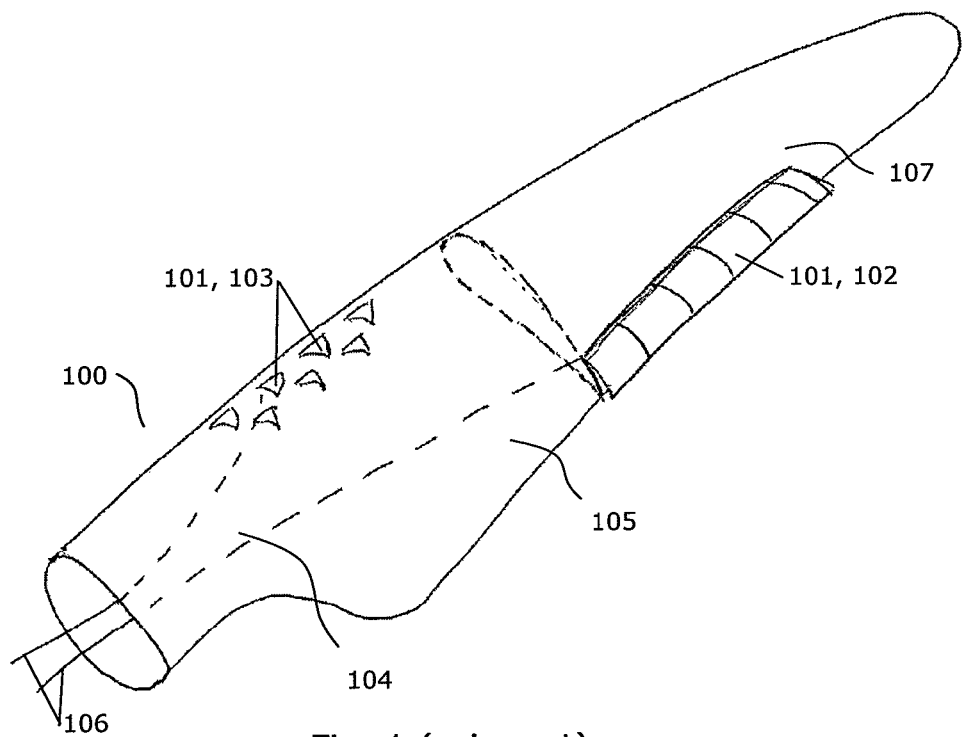

(52) U.S. Cl.
CPC ............. *F03D 1/0675* (2013.01); *Y02E 10/723* (2013.01); *F05B 2240/31* (2013.01); *F05B 2270/506* (2013.01); *F03D 7/0232* (2013.01)
USPC ........................................ 416/23; 416/146 R

(56) References Cited

U.S. PATENT DOCUMENTS

| | | | | |
|---|---|---|---|---|
| 6,200,096 | B1* | 3/2001 | Kohlhepp | 416/24 |
| 7,213,503 | B2* | 5/2007 | Asai et al. | 92/92 |
| 7,293,959 | B2* | 11/2007 | Pedersen et al. | 416/23 |
| 7,828,523 | B2* | 11/2010 | Bonnet | 416/1 |
| 8,267,654 | B2* | 9/2012 | van Dam et al. | 416/14 |
| 2008/0292461 | A1* | 11/2008 | Stiesdal | 416/147 |

FOREIGN PATENT DOCUMENTS

| | | |
|---|---|---|
| EP | 2 019 203 | 1/2009 |
| FR | 2 290 585 | 6/1976 |
| WO | 97/01709 | 1/1997 |
| WO | 2004/088130 | 10/2004 |
| WO | 2004/099608 | 11/2004 |
| WO | 2006/129254 | 12/2006 |
| WO | 2007/045940 | 4/2007 |
| WO | 2007/114698 | 10/2007 |
| WO | 2008/003330 | 1/2008 |

OTHER PUBLICATIONS

Yolaine Cussac; International Preliminary Report on Patentability issued in priority International Application No. PCT/EP2009/061137; Mar. 1, 2011; 7 pages; The International Bureau of WIPO.

* cited by examiner

CONTROL SYSTEM IN WIND TURBINE BLADES

FIELD OF THE INVENTION

The present invention relates to a wind turbine blade comprising devices for modifying the aerodynamic surface or shape of the blade which are activated by pneumatic actuators.

BACKGROUND

Most modern wind turbines are controlled and regulated continuously during operation with the purpose of ensuring optimal performance of the wind turbines in all operating conditions, such as at different wind speeds or subject to different demands from the power grid. Desirably, the wind turbine can also be regulated to account for fast local variations in the wind velocity—the so-called wind gusts. Also, as the loads on each of the blades vary due to e.g. the passing of the tower or the actual wind velocity varying with the distance to the ground (the wind profile), the ability to regulate each of the wind turbine blades individually is advantageous enabling the loads to be balanced reducing the yaw and tilt of the rotor.

A well-known and effective method of regulating the loads on the rotor is by pitching the blades. However, with the increasingly longer blades on modern wind turbines (which of present can be of 60 m or longer) pitching becomes a relatively slow regulation method incapable of changing the blade positions fast enough to account for e.g. wind gusts or other relatively fast load variations.

Another way of regulating the blades is by changing their aerodynamic surfaces or shapes over parts or the entire length of the blade, thereby increasing or decreasing the blade lift or drag correspondingly. Different means of changing the airfoil shape are known such as different types of movable or adjustable flaps (e.g. trailing edge flaps, leading edge slats or Krueger flaps, Gurney flaps placed on the pressure side near the trailing edge, ailerons, or stall inducing flaps), vortex generators for controlling the boundary layer separation, adaptive elastic members incorporated in the blade surface, means for changing the surface roughness, adjustable openings or apertures, or movable tabs. Such different means are here and in the following referred to in common as aerodynamic devices or devices for modifying the aerodynamic surface or shape of the blade. One important advantage of the relatively small aerodynamic devices is a potentially faster response due to less inertia than if the whole blade is being pitched.

One drawback with the known different systems of various aerodynamic devices of the above mentioned types is how they are actuated and controlled. In order to reach the devices potential in the regulation of wind turbines, the aerodynamic surface modifying devices need to be able to operate quickly and repeatedly. Therefore the power consumption could be considerable. In the known systems, the aerodynamic devices are powered directly from the hub via a power link. An electrical cable is however undesirable due to the inevitable implications in relation to lightning. Further, known systems may exhibit problems with their operational speed. Moreover, known systems may exhibit poor mechanical stability.

DESCRIPTION OF THE INVENTION

It is an object of embodiments of the invention to overcome or at least reduce some of the above described disadvantages of the known systems for control and activation of devices for modifying the aerodynamic surface of wind turbine blades.

It is a further object of embodiments of the invention to provide a wind turbine blade with control means for faster activation of devices for modifying the aerodynamic surface or shape of wind turbine blade for long wind turbine blades. A further object is to provide control means capable of yielding more accurate activation and control of the aerodynamic devices.

In accordance with the invention this is obtained by a wind turbine blade comprising
- a blade body,
- at least one device for modifying the aerodynamic surface or shape of the blade, the device being movably connected to the blade body,
- at least one pneumatic actuator for controlling the position and/or movement of the device,
- a pressure chamber for powering the pneumatic actuator and connected to the actuator via a valve system for controlling the powering of the actuator, and
- at least one signal communication pathway for conveying control signals and for connecting the valve system to a control unit operating the valve system by the signals.

Hereby is obtained a control and operating system for the aerodynamic devices on a wind turbine blade where the position and movement of the devices can be controlled and operated both fast and accurately both due to their low inertia and due to the pressure activation system and the way it is controlled. To a large extent any electrical wires running in the blade can be avoided by letting the aerodynamic devices be actuated by pneumatic actuators. Thereby risks connected to lightning could be reduced or avoided. By means of the valve system the precise amount and timing of the driving gas for powering the actuator in the desired way, can be controlled more accurately and fast than e.g. by controlling the driving media directly via adjusting the pressure in the pressure tank or pressure hoses guiding the driving media to the actuator. A fast responding control system is a prerequisite if the wind turbine blades are to be controlled optimally taking into account fast variations and fluctuations in the wind (e.g. wind gusts or due to tower passage). Thus, by lower reaction times of the actuating systems, the wind turbine can react faster to changing conditions thereby yielding a higher power output in some situations, a more balanced rotor, or a lower wear of some parts of the wind turbine in other conditions.

The use of a pressure chamber is advantageous in ensuring a pressurized driving media ready and available for repeatedly or continuously powering the actuators.

The described pressure control system is furthermore advantageous as low weight materials such a plastic materials can be used thereby making the system of low weight and inexpensive. Further still, the operating system of the blade construction can be made compact and robust, even more so as many of its parts can be partly or completely embedded in parts of the blade body.

In an embodiment of the invention, the communication pathway of the wind turbine blade according to the above comprises a power link. The aerodynamic surface of the wind turbine blade may hereby fast an effectively be regulated and modified continuously according to the signals e.g. from a central control unit placed for instance in the nacelle of the wind turbine. The control signals in the power link are electrical or light or other electromagnetic waves.

The communication pathway in the wind turbine blade according to another embodiment comprises a pressure tube for conveying pressure control signals. Here, the one or more pressure tubes comprise a liquid such as water and/or hydraulic oil, or a gas such as air. By the use of pressure tubes and hydraulics or pneumatics for the control of the valve system, the use of electrical wires in the wind turbine blade can be minimized if not completely avoided.

In a further embodiment, the pressure tube comprises a gas of a lower molecular weight than 28.9 kg/kmol, such as Helium He, Ammonia $NH_3$, Hydrogen $H_2$, Hydroxyl OH, Methane $CH_4$, Natural Gas, Acetylene $C_2H_2$, or Neon Ne. Dry air has a molecular weight of 28.96 kg/kmol (as determined e.g. in Chemical Rubber Company, 1983. CRC Handbook of Chemistry and Physics. Weast, Robert C., editor. 63rd edition. CRC Press, Inc. Boca Raton, Fla., USA) depending to some extend on the exact content of the different gasses in the mixture. Because the molecular weight of the gas according to the invention is lower than 28.9 kg/kmol and thereby lower than air, the speed of sound in the gas is correspondingly higher. Hereby is obtained a reduction in the delay of the control signals when sent from the control unit to the valve system as the pressure signals propagate with the speed of sound in the gas. The reduction in the signal delay is correspondingly larger, the longer the distance over which the signals are sent. The reduction of the time needed for transporting the signals is even more advantageous in view of the technological trend to increase the length of wind turbine blades, and as many aerodynamic devices are placed some distance from the blade root where the control signals are likely to terminate. The use of Helium may be further advantageous due to being light in combination with its non-corrosive, non-toxic, and non explosive properties while on the same time being relative easy to acquire.

According to a further embodiment of the invention the pressure chamber in the wind turbine blade according to any of the above is at least partly constituted by one or more sections of beam walls of the wind turbine blade or is at least partly placed within an internal spar of the wind turbine blade. This is advantageous due to the weight savings achieved hereby. Furthermore, such a construction of the either positive or negative pressure chamber for the operating system can be arranged in any position down the entire length of the wind turbine blade and can thus e.g. be arranged relatively close to any kind of aerodynamic device anywhere on the blade whether it is positioned in the root section of the blade, near the tip or anywhere in between. The use of the blade beams or internal spar furthermore makes it possible to make one or more pressure chambers of considerable sizes yet robust and with minimal additional material use.

In a further embodiment of the invention, the wind turbine blade further comprises one or more conduits connecting the pressure chamber to an outer surface of the wind turbine blade for guiding a flow of air to or from the pressure chambers thereby pressurizing the pressure chamber by the pressure difference across the blade body when the wind turbine is in use. Hereby the local pressure energy around the blade is guided into the pressure chamber and exploited by the drive system in providing operating power for operating the device which then can be driven at least partially by energy tapped locally close to the aerodynamic devices to be operated. The drive system capable of using the dynamic pressure energy outside the blade to provide the energy for the actuation of the devices can thus be placed locally, optionally further out in the wind turbine blade where the operational power is needed.

In one embodiment of the invention, at least one of the conduits terminates near the leading edge, on the suction side, and/or near the trailing edge of said wind turbine blade. The conduits may advantageously terminate in regions of high or low pressure to provide for maximum power, such as near the leading edge, on the suction side, and/or near the trailing edge of the wind turbine blade. In a further embodiment of the invention, at least one of the conduits terminates at the tip of said wind turbine blade.

The invention furthermore relates to a wind turbine blade according to any of the above embodiments, wherein the control unit is arranged at a root portion of the blade which is advantageous from weight considerations.

Furthermore, according to another embodiment, the pressure chamber is connectable to a pressure setting device designed to pressurize the pressure chamber which may be arranged at a root portion of the blade, whereby the pressure setting device influences minimally on the weight of the wind turbine blade.

The pressure setting device comprises in one embodiment a compressor or a pump.

According to a further embodiment of the invention, the device for modifying the aerodynamic surface or shape of the blade comprises at least one of: a movable trailing edge, an aileron, a flap, a vortex generator, an adaptive elastic member incorporated in the blade surface, a structure for changing the surface roughness, an adjustable aperture in the blade surface for changing the surface properties, and a movable tab.

According to another aspect, the invention relates to a wind turbine comprising a tower, a nacelle mounted to one end of the tower, and a rotor comprising at least one wind turbine blade according to any of the above mentioned embodiments. The advantages hereof are as mentioned previously in relation the different embodiments relating to the wind turbine blade.

In one embodiment, the wind turbine according to above comprises a control unit connected to a valve system via a signal communication pathway in at least one wind turbine blade. By placing the control unit outside the wind turbine blade such as in the nacelle or in the hub is obtained that the control unit does not contribute to the weight of the blade which advantageously is kept as low as possible to minimize the loads in gears, bearings etc.

In another embodiment, the wind turbine according to above comprises a control unit connected to a valve system via a signal communication pathway in each of the wind turbine blades of the rotor. By connecting the control unit to the drive systems in more than one blade of the wind turbine, these blades could be regulated and controlled together as a whole, for instance simultaneously or suitably delayed taking cyclic effects into account in the regulation. Further, connecting all the wind turbine blades to a common control unit makes it possible to control the blades with a view to minimizing the yaw of the rotor.

In a further embodiment of the invention, the wind turbine according to any of the above comprises a pressure setting device connected to the pressure chamber in at least one wind turbine blade or alternatively to the pressure chamber in each of the wind turbine blades of the rotor.

According to another aspect, the invention relates to a wind turbine blade comprising
  a blade body,
  at least one device for modifying the aerodynamic surface or shape of the blade, said device being movably connected to the blade body,
  at least one pneumatic actuator for controlling the position and/or movement of said device, and
  a pressure guiding means for powering said pneumatic actuator and connected to said actuator, and
  where said pressure guiding means comprises a gas of a lower molecular weight than 28.9 kg/kmol, such as Helium He, Ammonia $NH_3$, Hydrogen $H_2$, Hydroxyl OH, Methane $CH_4$, Natural Gas, Acetylene $C_2H_2$, or Neon Ne.

By such a control system, the low molecular weight of the driving gas is advantageous in resulting in shorter regulation times in that the pressure propagates with the speed of sound in the gas which is inversely proportional to the molecular weight of the gas as also described previously. Further advantages are as mentioned above for the first claim to the wind turbine blade In an embodiment of the invention, the pressure guiding means of the wind turbine blade according to the above comprises a pressure tank or a pressure hose guiding the driving media of the gas to the actuator. The advantages hereof are as mentioned previously in relation the different embodiments relating to the wind turbine.

In an embodiment of the invention, the pressure guiding means is connectable to a pressure setting device designed to pressurize the pressure guiding means, such as a compressor or a pump.

In an embodiment of the invention, the pressure guiding means is connected to the actuator via a valve system for controlling the powering of the actuator, and where the blade further comprises at least one signal communication pathway for conveying control signals and for connecting the valve system to a control unit operating the valve system by said signals.

BRIEFS DESCRIPTION OF THE DRAWINGS

Figure 2:
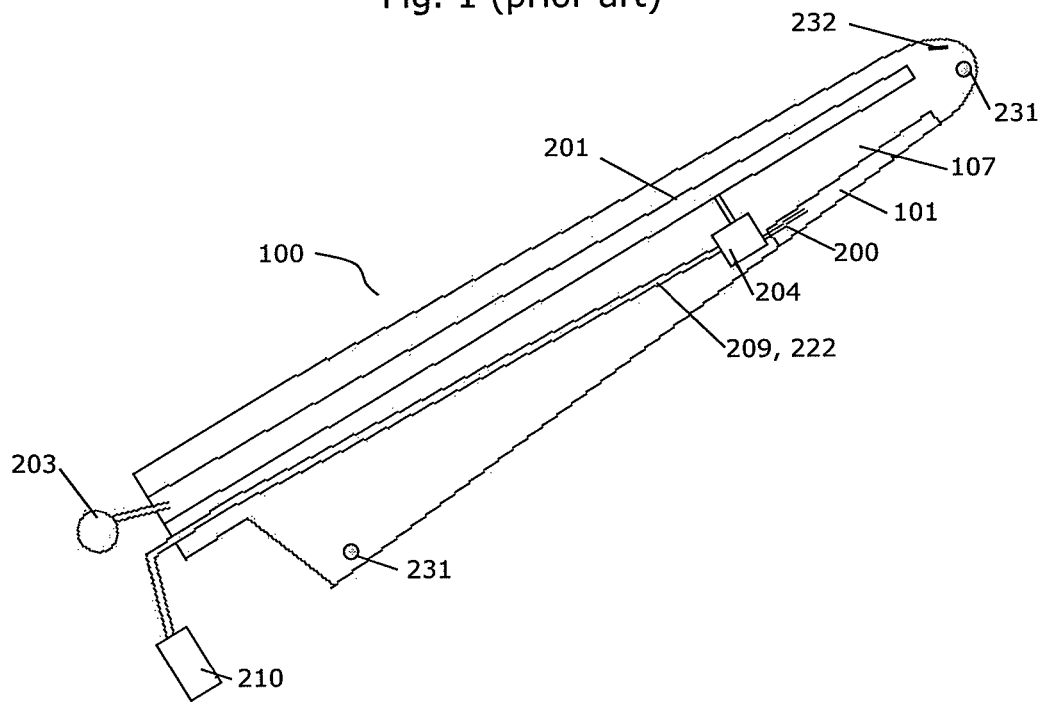
Figure 3:
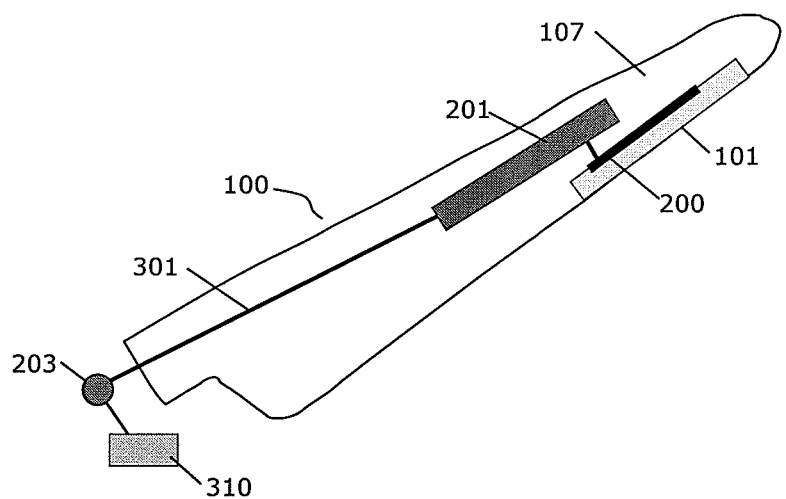
Figure 4:
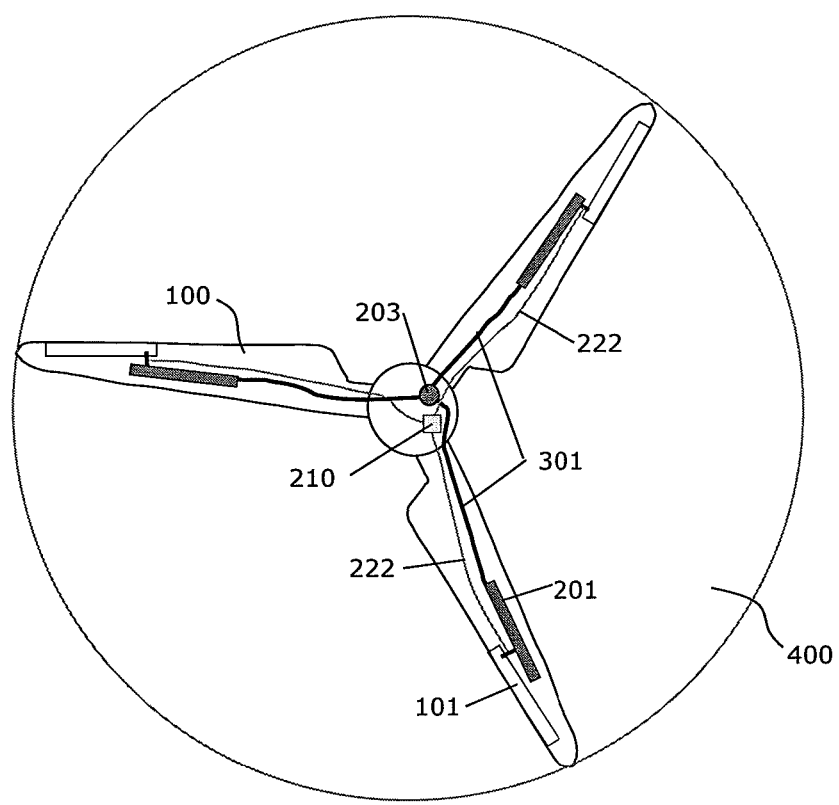
Figure 5:
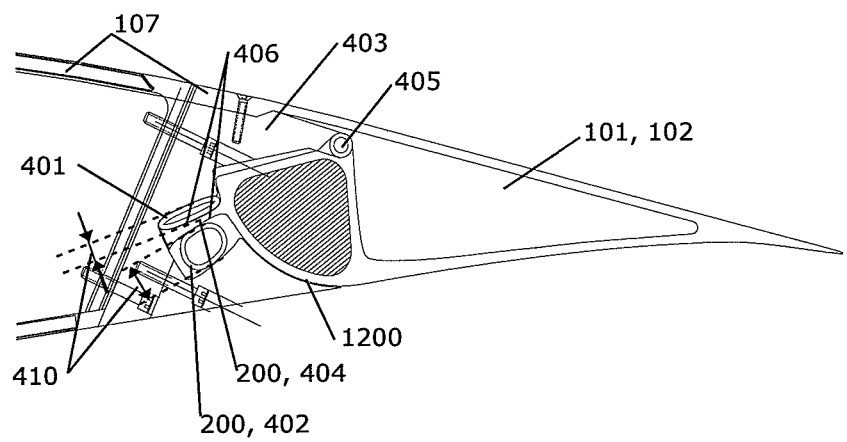
Figure 6:
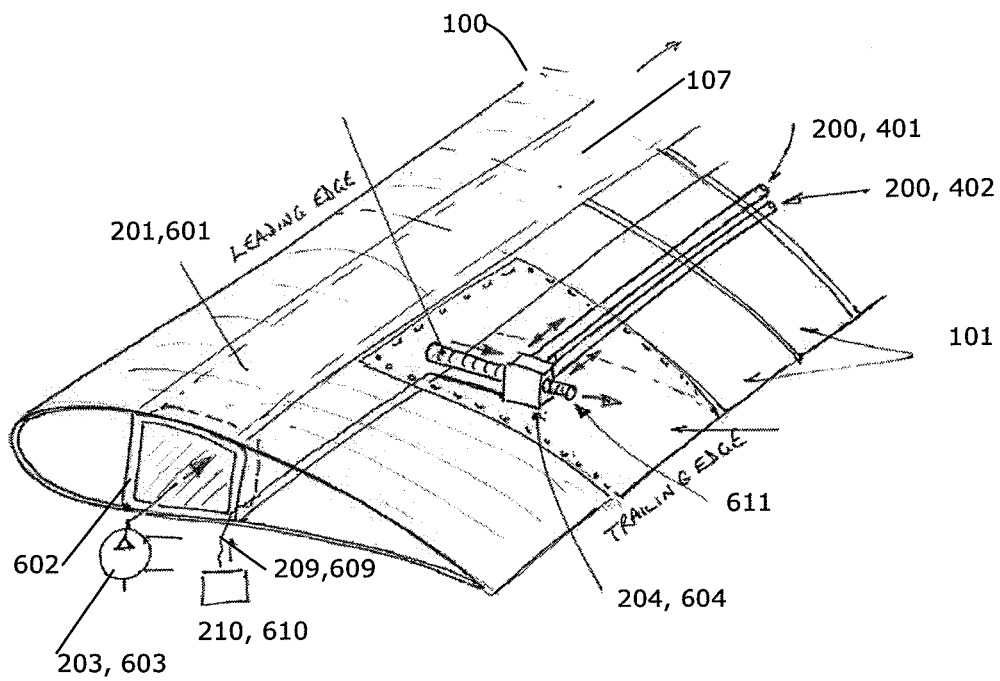
Figure 7:
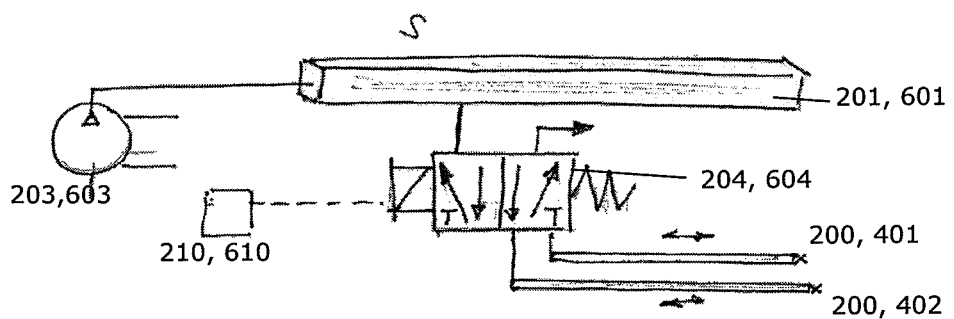
Figure 8:
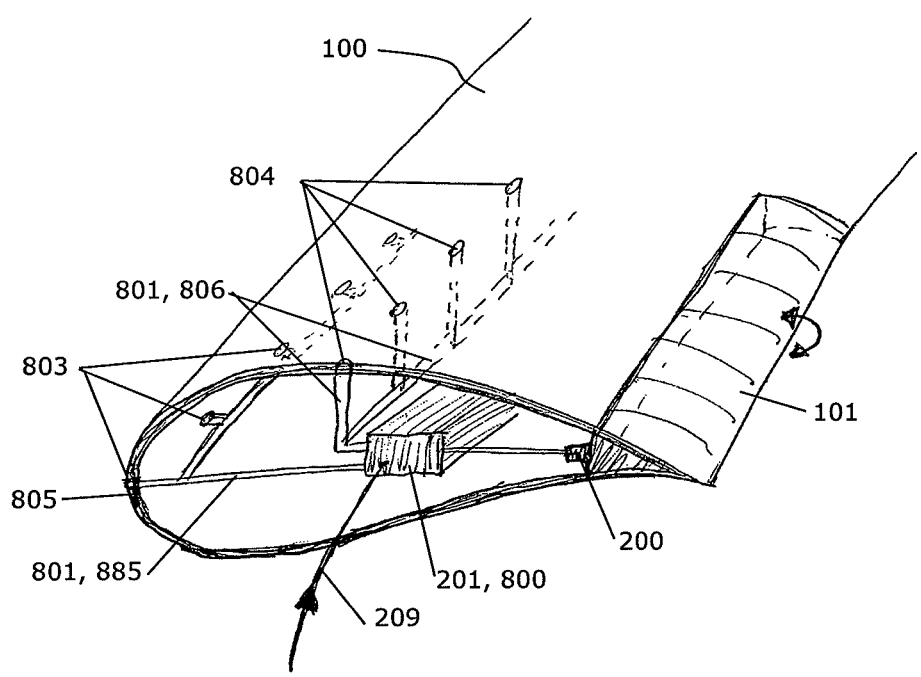

In the following different embodiments of the invention will be described with reference to the drawings, wherein:

FIG. 1 shows a sketch of a wind turbine blade according to prior art and comprising movable aerodynamic devices in the shape of a movable trailing edge and vortex generators, FIG. 2 shows a sketch of an embodiment of a wind turbine blade according to the invention illustrating the control system of an aerodynamic device in the shape of a movable trailing edge, FIG. 3 illustrates an embodiment of a wind turbine blade according to the invention where the aerodynamic device is driven by a gas of lower molecular weight than 28.9 kg/kmol and thereby lower than air, FIG. 4 shows a sketch of a rotor for a wind turbine, comprising three turbine blades with aerodynamic devices controlled by a control unit and driven by pressure from pressure tanks in each blade, FIG. 5 show an embodiment of an active trailing edge being controlled and operated by pressure according to an embodiment of the invention, FIG. 6 shows a sketch of a wind turbine blade comprising an operating mechanism according to the invention, FIG. 7 illustrates the connection of an operating mechanism according to the invention and connected to an inner positive or negative pressure chamber, and FIG. 8 shows in a perspective cross sectional view an embodiment of a part of a wind turbine blade according to the present invention.

DETAILED DESCRIPTION OF THE DRAWINGS

FIG. 1 shows a blade 100 for a wind turbine according to prior art and comprising some examples of so-called aerodynamic devices 101. When manipulated, the aerodynamic devices connected to the blade body 107 change the aerodynamic surface or shape 105 of the wind turbine blade 100 thereby altering the lift and/or drag coefficients of the wind turbine blade during operation. In the examples illustrated in this figure, the aerodynamic shape 105 of the wind turbine blade 100 can be changed and regulated by changing the position of the movable trailing edge flap 102 placed a distance out along the length of the blade, or by the activation of a number of movable vortex generators 103 placed in this example closer to the root end 104 of the wind turbine blade on its suction side. As also mentioned in the background description, examples of such aerodynamic devices 101 are: different movable or adjustable flaps, e.g. trailing edge flaps 102, leading edge slats or Krueger flaps, Gurney flaps placed on the pressure side near the trailing edge, ailerons, or stall inducing flaps, vortex generators 103 controlling the boundary layer separation, adaptive elastic members incorporated in the blade surface, means for changing the surface roughness, adjustable openings or apertures, or movable tabs.

Traditionally, the various aerodynamic devices 101 are powered directly from the hub via some kind of power link 106 as sketched in FIG. 1. Electrical cables are however undesirable due to the inevitable implications in relation to lightning. Alternatively, the various aerodynamic devices 101 may be powered directly from the hub by means of air powered links which however lead to considerable size demands for modern wind turbine blades of 60 m or longer.

According to one embodiment of the present invention, these problems are reduced or solved by a system for controlling and powering the operation of the aerodynamic devices 101 as sketched in FIG. 2. Here, the aerodynamic device 101 which in this case is illustrated as an active trailing edge flap, is actuated and operated by a pneumatic actuator 200 converting energy (e.g. in the form of compressed air) into motion force or force needed to maintain a certain position of the aerodynamic device. Different types of actuators may be employed such as linear or rotary, depending on the type, size, and position etc. of the aerodynamic device to actuate. The driving pressure of the actuator 200 is transferred from a pressure chamber 201 placed within the blade body 107. Here, and throughout the entire description, a pressure chamber or reservoir is to be understood as covering both a negative pressure system (a vacuum system) or as a positive pressure system, the latter having the advantage of being able to operate with larger pressure differences whereby the same magnitude of forces can be obtained with a physically smaller system. In some embodiments the pressure chamber may be conveniently placed in between the main beams or the internal webs of the spar 602 of the wind turbine blade 100 (see FIG. 6). In an embodiment the pressure chamber may be constituted by one or more sections of the beam or spar walls of the wind turbine blade. The pressure chamber is connected to and pressurized by a pressure setting device such as e.g. a compressor or a pump 203. The pressure setting device 203 may be placed in a root portion 104 of the blade or alternatively in the nacelle or the hub of the wind turbine.

Referring to FIG. 2, the pressure chamber is connected to the actuator 200 via a valve system 204 which based on control signals 209 from a control unit 210 controls the driving pressure and hereby the position and movement of the aerodynamic device 101. The valve system 204 is connected to the control unit 210 operating the valve system via a signal communication pathway 222 conveying the control signals 209. The signal communication pathway may be connected directly to the control unit or indirectly via a signal interface. The control unit 210 may be placed in the blade body 107 itself for instance in a root portion 104 of the blade or it may be placed in the hub or the nacelle of the wind turbine. The signals sent by the control unit operating the valve system may be based on different system parameters for the wind turbine such as rotational speed, weather conditions (e.g. wind velocities, temperature, humidity), the present and desired power yield, tower or nacelle accelerations etc. The system parameters may be received from e.g. sensors placed on the blades, nacelle or tower, from its surroundings, from other wind turbines in the same wind park, from the power grid etc.

By regulating the pressure from the pressure chamber or reservoir by means of the valve system 204, a faster and a far more precise and accurate control of the driving pressure can be obtained instead of e.g. regulating and adjusting the pressure in the pressure chamber according to the driving pressure needed without a controllable valve system.

Also, compared to the control system according to prior art of FIG. 1 of air power links directly from the hub to the actuators, the use of the pressure chamber or reservoir ensures a large source of a more constant driving pressure to be present.

Additionally, the wind turbine blade 100 may comprise one or more drainholes 231 for allowing water, small dirt particles etc to escape from the interior of the blade body 107. Such drainholes may advantageously be placed near the tip of the blade and/or near the trailing edge. The wind turbine blade may also comprise a lightning arrestor device 232 for catching lightnings and guiding them safely to the ground without damaging the material or other devices in the blade body 107.

The signal communication pathway 222 conveying or sending the control signals 209 to the valve system for controlling the actuator(s) may for instance be a power link which is advantageous in being simple and inexpensive to imbed or in other ways establish within the blade body and in providing fast signals over long distances.

In another embodiment the signal communication pathway 222 may comprise one or more pressure tubes for conveying pressure control signals, —either pneumatic or hydraulic. In the latter case the hydraulic fluid may be for instance water, or a type of hydraulic oil. If the control signals are pneumatic, the pressure tubes may comprise a gas such as air. Air is advantageous for the obvious reasons of requiring no special safety provisions towards leaks, inflammability etc.

All or some of the different parts (conduits, inlets, valves, etc) in the described system for powering and controlling the devices for modifying the aerodynamic profile of the wind turbine blade can advantageously be made of lightweight and electrically non-conductive materials such as for instance plastics. Hereby is obtained both a system of low weight which is advantageous in adding minimally to the undesirable loads in the rotor caused by the weight of the wind turbine blade. Furthermore the use of electrically non-conductive materials is advantageous from lightning considerations. Further some of the parts in the described system according to the invention may be fully or partly embedded in the blade parts during manufacture improving the durability of the system parts under use.

The operating speed of the aerodynamic devices and therefore of the actuators affects the efficiency of the wind turbine in enabling the wind turbine to be optimally controlled for a longer period of its time in operation. Optimally controlled may in some scenarios depending on the actual wind situation imply to maximize the power output of the wind turbine or in other scenarios to minimize the loads exerted by the wind on the different parts of the wind turbine.

One parameter influencing the operational speed is the length of the communication pathway between the valve system and the control unit operating the valve system. If air is used as the driving media in the pressure tubes for communicating the signals, the information signals (being the pressure changes in the tubes) propagate with the speed of sound in the air of approximately 344 m/s at 20° C. For a 33 m long distance (corresponding to a typical distance for many proposed blades with trailing edge flaps) this yields a delay of the pressure signal of about 0.1 seconds.

According to an embodiment of the invention, a gas or a gas mixture of a lower molecular weight than 28.9 kg/kmol and thereby lower than air (having a molecular weight of 28.96 kg/kmol) is used as the driving media in the pressure tube. Such a gas could for instance by Helium (He) or Hydrogen ($H_2$). Hereby is obtained an increase in the operational time of the system. The speed of sound in a gas squared is inversely proportional to the molecular weight of the gas in question. Thus, the lower the molecular weight of the gas, the higher the speed of sound. Examples of densities and molecular weights of some different gases are shown in the table below also including the data from dry air for comparison. The gasses in the table all have a lower molecular weight than air wherefore the speed of sound and thus the speed of the pressure changes constituting the information signals in the communication pathway according to the invention is higher yielding faster operation times of the proposed control system. In the case of Helium, the molecular weight is approximately 4.02 yielding a speed of sound of around 927 m/s at 20° C. or almost three times as high as in air. For the same example as above of a 33 m long distance this yields a significantly smaller delay of the pressure signal of about 0.03 seconds.

In other embodiments the pressure tube comprises any of the following gases or mixtures hereof: Helium He, Ammonia $NH_3$, Hydrogen $H_2$, Hydroxyl OH, Methane $CH_4$, Natural Gas, Acetylene $C_2H_2$, or Neon Ne.

| Gas | Formula | Molecular weight (kg/kmol) | Density (kg/m$^3$) |
|---|---|---|---|
| Acetylene (ethyne) | $C_2H_2$ | 26.04 | 1.092 1.170 |
| Air |  | 28.96 | 1.205 1.293 |
| Ammonia | $NH_3$ | 17.031 | 0.717 0.769 |
| Helium | He | 4.02 | 0.1664 |
| Hydrogen | $H_2$ | 2.016 | 0.0899 |
| Hydroxyl | OH | 17.01 |  |
| Methane | $CH_4$ | 16.043 | 0.668 0.717 |
| Natural gas |  | 19.5 | 0.7-0.9 |
| Neon | Ne | 20.179 |  |
| Water Vapour | $H_2O$ | 18.016 | 0.804 |

In one embodiment of the invention, air which is cheap and non-complicated to use, is used as the powering medium in the pressure chamber while another medium with a lower molecular weight (as e.g. suggested in the table above) is used for the control signals. This other medium may be more expensive but on the other hand only a very limited quantity is needed for the control signals.

In one embodiment of the invention, a gas of lower molecular weight than air as discussed above may also be used as pressure medium in the pressure tank. In a further embodiment as illustrated in FIG. 3, the devices for controlling the aerodynamic surface or shape of a blade 101 may be controlled by a pneumatic actuator 200 driven by a gas of lower molecular weight than air and driven directly by a pressure setting device 203. The gas is then guided via pressure guiding means such as pressure tubes or hoses 301 (and optionally via a pressure tank 201) to drive the actuator 200. The driving pressure on the actuator 200 is in the embodiment of FIG. 3 controlled by a control unit 310 acting on the pressure setting device 203. As the case in the previous embodiments, the pressure setting device and/or the control unit may be placed in the blade body 107 itself e.g. in a root portion of the blade, or may be placed outside the blade in the hub or nacelle of the turbine.

In FIG. 4 is shown an embodiment of the invention of a wind turbine rotor 400 in this case comprising three blades 100. Each blade 100 comprises one or more devices for modifying its aerodynamical surface or shape of the blade 101 which are activated by pressure from a pressure tank 201 in this embodiment placed a distance out in the blade. Here, one pressure setting device such as a compressor or a pump 203 keeps the pressure in all three pressure tanks within a desired level via pressure hoses 301 from the compressor or pump to the pressure tank. Similarly only one control unit 210 is in this example coupled via communication pathways 222 to the valve systems (not shown) in all three blades thereby controlling the pressure guided from the pressure tanks to the pneumatic actuators of the aerodynamic devices 101. The communication pathways may be directly connected to the control unit or indirectly via signal interfaces. By letting a central control unit operate all or some of the aerodynamic devices in all the wind turbine blades, the control unit may control and regulate all the blades in unison or alternatively in dependence of each other taking for instance cyclical effects into account such as the tower passage or the wind velocity varying with the distance from the ground.

In one embodiment, sensors signals of e.g. velocities or accelerations measured on one blade may be used in controlling the aerodynamic devices on the following wind turbine blade 120 degrees later in the rotor rotation, the blade in this way being optimally operated according to its present and current conditions as measured by the preceding blade. Further, connecting all the wind turbine blades to a common control unit makes it possible to regulate the blades with a view to minimizing the yaw of the rotor.

In the FIG. 5 is shown an embodiment of an active trailing edge 101, 102 which is manipulated and controlled by a control and operating system according the invention, and in a position corresponding to a fully or nearly activated or deactivated state. Here, the actuator 200 actuating the aerodynamic device comprises two flexible actuating pressure hoses 401, 402 which run along the length of the aerodynamic device 101. The actuating pressure hoses 401, 402 are arranged next to and in this embodiment on opposing sides or surfaces 406 of a lever element 404 connected to or a part of the movable trailing edge 102. The movable trailing edge 102 is movably connected to the blade body 107 and can be rotated in relation to the blade body around the hinge 405. In this embodiment the lever element 404 extends in a direction directly from the hinge 405 whereby the forces applied to the lever elements from the actuating pressure hoses are optimally transferred to a rotational movement of the trailing edge around the hinge.

The actuating pressure hoses are made of a compressible material such as for instance a thermoplast or elastomer which may be fibre reinforced allowing the hose to be compressed or squeezed thereby attaining a smaller cross sectional diameter or width 410 depending on the pressure inside the hose relative to the external pressure and forces applied to it. In the situation shown in FIG. 5, the $1^{st}$ actuating pressure hose 401 is depressurised (for instance by applying a vacuum to it or by venting it to atmospheric pressure), and the $2^{nd}$ actuating pressure hose 402 has been pressurized whereby the $1^{st}$ actuating pressure hose 401 is compressed and squeezed to a certain extent resulting in the trailing edge flap 102 being held in its lowermost position.

The two actuating hoses 401, 402 may run along parts of or the entire length of the trailing edge flap 102 whereby the entire trailing edge flap to be controlled uniformly by only a single actuator 200. Alternatively, a number of actuating pressure hoses may be connected in series or parallel to different parts or sections of the aerodynamic device whereby the trailing edge flap may be controlled faster. Several systems of actuating pressure hoses may also be applied on different parts of the trailing edge flap to allow the flap movement to be e.g. gradually increasing from its one end to the other, or allowing different parts of the device to be controlled and moved independently and individually etc.

In the embodiment shown in FIG. 5, the compartment 408 comprising the two actuating pressure hoses 401, 402 on each side of the lever element 405 in comprised in an intermediate attachment element 403 connecting the trailing edge to the blade body 107. This construction may be advantageous during assembly of the different blade parts allowing the trailing edge to be assembled with the attachment element prior to fastening to the main part of the blade. Alternatively the compartment 408 for the actuating pressure hoses may be comprised directly in the main blade body.

In another embodiment of the operating mechanism, the trailing edge flap 102 is connected to the blade body 107 by means of flexible connection joint around which the flap 102 rotates.

As illustrated in the FIG. 5, a radial surface 1200 with its center in the rotation hinge 405 may be provided to enable the flap 102 to move while maintaining the continuity of the blade surface when the flap is actuated.

In FIGS. 6 and 7 is sketched how the operation mechanism comprising here a set of two actuating pressure hoses 401, 402 may be pressurized by being coupled to a pressure chamber 201 within the blade body 107. In this embodiment the pressure chamber is placed in between the main beams or the spar 602 of the wind turbine blade 100 and is pressurized by a compressor 203, 603 which may be placed in the root section of the blade or alternatively in the nacelle of the wind turbine. In one embodiment of the invention the spar 602 may in itself constitute a pressure chamber for pressurizing the operating mechanism. The pressure chamber is connected to the pressure hoses via a valve system 204, 604 which based on control signals 209, 609 from a controller 210, 610 regulates the pressure in the different actuation pressure hoses 401, 402 and hereby the position and movement of the aerodynamic device 101. One more detailed embodiment of a valve system 204 is shown in FIG. 7. For depressurizing the actuation pressure hoses, the valve system can be vented 611 by connection to for instance an outer surface of the blade or to some internal part of the blade of atmospheric pressure. In the FIG. 6, the control system and the operating mechanism is illustrated for operating a movable trailing edge flap 102 which is segmented. However, the principles of the operating mechanism and its coupling to a pressure chamber are the same for other aerodynamic devices for modifying the aerodynamic surface of the wind turbine blade such as ailerons, vortex generators etc.

The sizes of the pressure needed for controlling and regulating an aerodynamic device such as a movable trailing edge depend on different factors such as the dimensions (typically 15-30% chord and 10-20% blade length) and weights of the devices to be moved and controlled, the driving media chosen, the regulation speed required, and the elastic properties of the actuating pressure hoses or actuator in general. The regulation speed is typically of the order of 50-500 msec and the pressure required is typically 0.2-0.6 bar.

In another embodiment of the invention, the pressure distribution around and on the surface of an airfoil corresponding to the outer cross sectional geometry of a wind turbine blade 100 at some position down the length of the blade may be exploited in driving the aerodynamic devices. Typically, during operation a positive pressure is present on the pressure side of the airfoil including at the leading edge 805 whereas a negative pressure is present on the suction side of the airfoil. The pressure distribution depends (apart from the aerodynamic surface geometry) upon the actual angle of attack of the blade and on the velocity of the wind. As sketched in FIG. 8, these differences in pressure are exploited in the control and operating system as previously described.

FIG. 8 shows a part of a wind turbine blade 100 seen in a perspective cross sectional view. Any internal spars or beams or alternative stiffening structure of the blade are not shown for clarity. A number of conduits 801 such as hoses or pipes connect the exterior of the blade to the driving system 800 comprising the pressure tank 201 and a valve system, thereby guiding ambient air as an air flow to and from the pressure tank due to the pressure differences at the in- and outlets positions 803, 804 and thereby pressurizing the pressure chamber. In FIG. 8 one first set of conduits or pipes 885 end on the blade exterior or outer surface near the blade leading edge 805 where a positive pressure is most often present during operation of the wind turbine. Further, a second set of conduits or pipes 806 terminates on the suction side of the blade airfoil where a negative pressure is typically present during operation.

A pressure difference could of course alternatively be realized with conduits ending at other positions on the outer surface of the wind turbine blade with a view to the pressure distribution around the wind turbine blade for different aerodynamic surface geometries, different angles of attack, and different wind velocities. Optionally, the pressure difference across the drive system 800 could also be realized by exploiting the difference in pressure from somewhere on the exterior surface of the blade to a position within the blade. The drive system could as previously mentioned both work as a vacuum system or as a positive pressure system.

The drive system 800 yields as output 810 a pneumatic pressure to one or more aerodynamic devices 101 via one or more actuators 200 for modifying the aerodynamic surface of the wind turbine blade as illustratively exemplified with a movable trailing edge 102 in FIG. 8.

In a further embodiment of the invention, the drive system 800 is also connected to a control unit from which control signals 209 comprising information on the desired operational parameters of the devices for modifying the aerodynamic surface. The control signals 209 could as previously described be given to the drive systems optionally without the use of electrical wires and electrically conductive materials for instance by the use of pressure controls signals being advantageous in minimizing the risk of damages from lightning.

The drive system could in one embodiment of the invention comprise a servomechanism optionally (but not necessarily) also comprising a feed-back system to the movable or adjustable aerodynamic device. The feed-back system then correlates some actual condition parameter (such as e.g. the position) of the aerodynamic device to the desired condition for the device for instance being pre-defined or being given by some control signal. In another ernbodiment the feed-back system could correlate the actual condition of the aerodynamic device directly to the pressure difference experienced by the drive system. In this way the system could be designed to keep on adjusting the aerodynamic profile until some given pressure differences were attained and thereby a desired pressure distribution around the airfoil. Hereby is in other words obtained a passive and automatic operating and regulation system where the aerodynamic device adapts itself according to the pressure distribution profile around the wind turbine blade.

The servomechanism could for instance be a pressure servo or a vacuum servo similar to the ones applied in many car braking systems.

The invention claimed is:

1. A wind turbine blade comprising:
   a blade body,
   at least one device for modifying the aerodynamic surface or shape of the blade, said device being movably connected to the blade body,
   at least one pneumatic actuator for controlling the position and/or movement of said device,
   a pressure chamber positioned within the blade body for powering said pneumatic actuator and connected to said actuator via a valve system for controlling said powering of said actuator, and
   at least one signal communication pathway for conveying control signals and for connecting the valve system to a control unit operating the valve system by said signals.

2. The wind turbine blade according to claim 1 where the at least one communication pathway comprises a power link.

3. The wind turbine blade according to claim 1 where the at least one communication pathway comprises a pressure tube for conveying pressure control signals.

4. The wind turbine blade according to claim 3 where said pressure tube comprises a gas.

5. The wind turbine blade according to claim 3 where said pressure tube comprises a gas of a lower molecular weight than 28.9 kg/kmol.

6. The wind turbine blade according to claim 5 where the gas comprises one of Helium He, Ammonia $NH_3$, Hydrogen $H_2$, Hydroxyl OH, Methane $CH_4$, Natural Gas, Acetylene $C_2H_2$, or Neon Ne.

7. The wind turbine blade according to claim 3 where said pressure tube comprises a liquid such as water and/or hydraulic oil.

8. The wind turbine blade according to claim 1, further comprising one or more conduits connecting said pressure chamber to an outer surface of the wind turbine blade for guiding a flow of air to or from said pressure chambers thereby pressurizing said pressure chamber by the pressure difference across the blade body when the wind turbine is in use.

9. The wind turbine blade according to claim 8, where at least one of said conduits terminates near the leading edge, on the suction side, and/or near the trailing edge of said wind turbine blade.

10. The wind turbine blade according to claim 8, where at least one of said conduits terminates at the tip of said wind turbine blade.

11. The wind turbine blade according to claim 1, wherein said control unit is arranged at a root portion of the blade.

12. The wind turbine blade according to claim 1, where the pressure chamber is connectable to a pressure setting device designed to pressurize the pressure chamber.

13. The wind turbine blade according to claim 12, wherein said pressure setting device is arranged at a root portion of the blade.

14. The wind turbine blade according to claim 13, where the pressure setting device comprises a compressor or a pump.

15. The wind turbine blade according to claim 1, where said device comprises at least one of: a movable trailing edge, an aileron, a flap, a vortex generator, an adaptive elastic member incorporated in the blade surface, a structure for changing the surface roughness, an adjustable aperture in the blade surface for changing the surface properties, and a movable tab.

16. A wind turbine comprising a tower, a nacelle mounted to one end of the tower, and a rotor comprising at least one wind turbine blade according to claim 1.

17. The wind turbine according to claim 16, comprising a control unit connected to the valve system via signal communication pathway in at least one wind turbine blade.

18. The wind turbine according to claim 16, where said control unit is connected to the valve system via signal communication pathway in each of the wind turbine blades of the rotor.

19. The wind turbine according to claim 16, comprising a pressure setting device connected to the pressure chamber in at least one wind turbine blade.

20. The wind turbine according to claim 16, where said pressure setting device is connected to the pressure chamber in each of the wind turbine blades of the rotor.

21. A wind turbine blade comprising:
a blade body,
at least one device for modifying the aerodynamic surface or shape of the blade, said device being movably connected to the blade body,
at least one pneumatic actuator for controlling the position and/or movement of said device,
a pressure chamber for powering said pneumatic actuator and connected to said actuator via a valve system for controlling said powering of said actuator, where said pressure chamber is at least partly constituted by one or more sections of beam walls of the wind turbine blade, and
at least one signal communication pathway for conveying control signals and for connecting the valve system to a control unit operating the valve system by said signals.

22. A wind turbine blade comprising:
a blade body,
at least one device for modifying the aerodynamic surface or shape of the blade, said device being movably connected to the blade body,
at least one pneumatic actuator for controlling the position and/or movement of said device,
a pressure chamber for powering said pneumatic actuator and connected to said actuator via a valve system for controlling said powering of said actuator, where said pressure chamber is at least partly placed within an internal spar of the wind turbine blade, and
at least one signal communication pathway for conveying control signals and for connecting the valve system to a control unit operating the valve system by said signals.

23. A wind turbine blade comprising:
a blade body,
at least one device for modifying the aerodynamic surface or shape of the blade, said device being movably connected to the blade body,
at least one pneumatic actuator for controlling the position and/or movement of said device,
a pressure chamber for powering said pneumatic actuator and connected to said actuator via a valve system for controlling said powering of said actuator, and
at least one signal communication pathway for conveying control signals and for connecting the valve system to a control unit operating the valve system by said signals, where the at least one communication pathway comprises a pressure tube for conveying pressure control signals.

* * * * *